Figure 1:
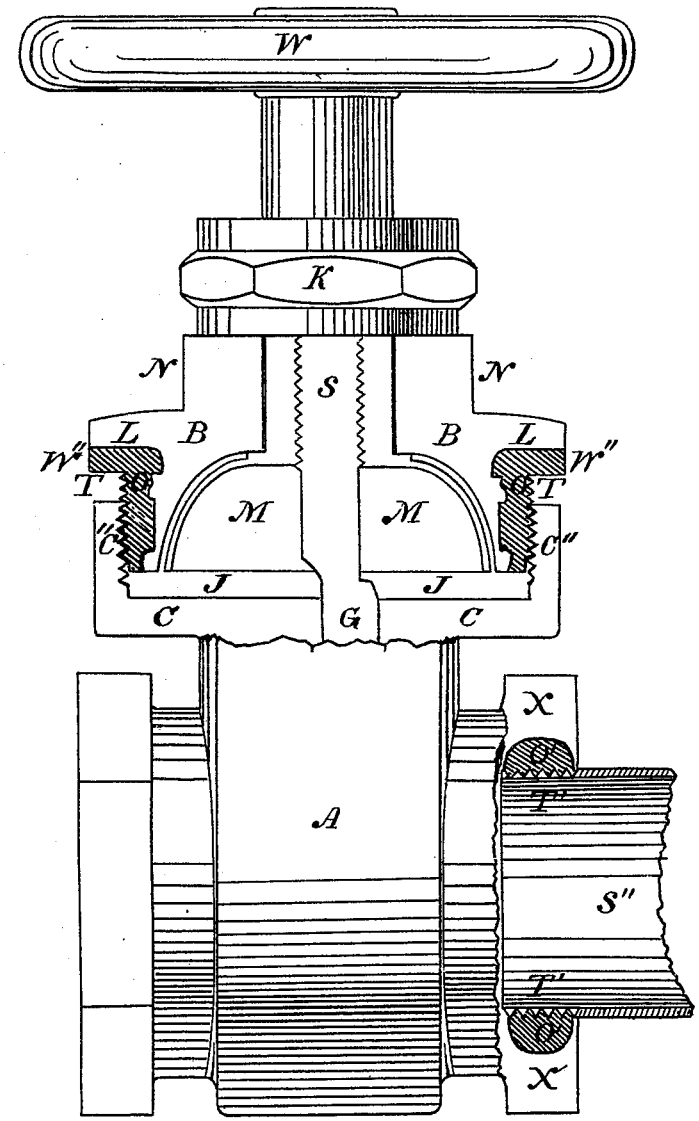

2 Sheets—Sheet 2.

J. WARD.
STOP-VALVE.

No. 182,874.  Patented Oct. 3, 1876.

UNITED STATES PATENT OFFICE.

JOHN WARD, OF LANSINGBURG, ASSIGNOR TO LUDLOW VALVE MANUFACTURING COMPANY, OF TROY, NEW YORK.

IMPROVEMENT IN STOP-VALVES.

Specification forming part of Letters Patent No. 182,874, dated October 3, 1876; application filed August 2, 1876.

*To all whom it may concern:*

Be it known that I, JOHN WARD, of the town of Lansingburg, county of Rensselaer and State of New York, have invented a new and improved method for attaching the covers or caps of valves to the valve-cases, and also attaching pipes to the entry and discharge ports of valves, of which the following is a specification:

The nature of my invention consists of a new and improved method of securing and attaching the caps of valves to the valve-cases, as well as for attaching pipes to the entry and discharge ports of valves, so that the threaded parts used in making such connection shall not become fixed by rust, and thus rendered difficult to remove.

As valves have been usually made the caps or valve-covers through which the stems pass have been made to face a corresponding parallel surface upon the case, with the coinciding parts thus formed secured together by means of nuts and bolts. While this means of attaching the parts made a good and substantial means to accomplish the connection, it added much to the weight and size of the valves, and where room was an object it often created much inconvenience. All efforts made to use a threaded connection upon valves of a large size between the cap and case would result in the parts becoming fixed from rust, so that they were separated with difficulty.

To remedy this latter objection, and so as to use a threaded connection between the valve cap and case, is the object of my invention.

This I accomplish by forming the usual threaded opening in the top of the valve-case, and instead of forming a thread upon the entering portion of the cap the latter is jogged upon the bottom to form an entering-plug, which has an annular recess about its axis, with no portion of the plug so formed in contact with the case except its seat at the bottom. Around this plug thus formed is arranged a Babbitt-metal jacket, which closely fits the thread made in the opening in the top of the valve-case, and fills all the space between the plug and case within the opening. This jacket is made by pouring melted Babbitt metal into the recess formed in the plug, and between it and the threaded wall of the case-opening, so as to fill up all the space, and thus the thread formed upon the case is templeted upon the plug-jacket. A nut is arranged upon the cap, by which means the plug and jacket thus templeted upon it may be screwed out.

To prevent the plug from turning within the jacket the walls of the plug are ribbed vertically, or they may have angular faces, if desired, so as to form clinching-surfaces within the jacket.

While I have described the Babbitt-metal jacket as placed upon the plug, with the thread templeted upon it from the thread cut in the walls of the case-opening, the same result may be accomplished by forming a recess within the walls of the case-opening for the reception of the Babbitt metal instead of a thread. In this modification the recess in the walls of the case-opening is ribbed or faced angularly to prevent the Babbitt metal from turning, and the thread is templeted upon the latter metal from the threaded plug, when the melted metal is poured in to fill up the space between it and the recessed walls of the case-opening. The Babbitt metal is also used to form a washer surface between the coinciding faces of the cap and case by leaving a space between these surfaces, and strapping the same to retain the melted metal until cooled, with an opening in the strap for a pouring-sprue.

When entry and discharge pipes are to be attached to the port-openings of the valve, I prefer to form the recess within the walls of the port-openings in revolution about the opening, with the thread upon the pipe, so that when the melted Babbitt metal is poured into the recess and space between the pipe and recess wall, the thread will be templeted upon the metal thus introduced, the sprue for pouring in the melted Babbitt metal being formed by means of a notched orifice formed in the edge of the valve-port opening, and in connection with the recessed space.

Though I have named Babbitt metal for this purpose, any analogous alloy will answer as well that is easily fused, and flows as well when melted, and does not oxidize or corrode, so as to fix the thread.

I do not consider it my invention, broadly, to form a threaded connection between the cap and case of the valve, or between the pipes and valve-ports, for I am aware that it is a well-known means, and I desire to limit my invention in consequence thereof to the application and manner of using a different metal within the recessed areas from that of which the other threaded part in contact is composed, as I have described it, and for the purposes named.

Figure 1 of the accompanying drawings illustrates a valve with my invention shown therein, in which the parts to which it relates are shown in vertical section, and the rest of the valve in perspective.

The parts in vertical section are the cap L L; the plug formed by jogging the former B B; that part of the valve-case which is threaded and connects with the cap at C″ C″; the Babbitt-metal jacket O O; the seat in the case for the plug to close upon when screwed down at J J; the Babbitt-metal washer-surface between the cap and case at W″ W″; the vertical walls of the nut upon the cap, for screwing it into the case at N N. The plug B is represented as partly screwed out of the case, so as to leave the space T T between the Babbitt-metal washer-surface W″ W″ and case C′. The parts shown in perspective are the wheel W, the lower part of the valve-case A, and the nut K.

At the bottom and right of Fig. 1, as facing the view in vertical section, is shown the modification of my invention where the recess for the Babbitt metal is formed within the port-opening of the valve-case with the thread upon the pipe. The recess and Babbitt metal is designated at O″ O″, the pipe at S″, the thread upon the same at T″ T, and the port wall at X X. This same method may be applied equally well to connect the cap and case with the recess formed in the wall of the case-opening, and the thread cut upon the plug, and the jacket upon the latter dispensed with.

Figure 2:
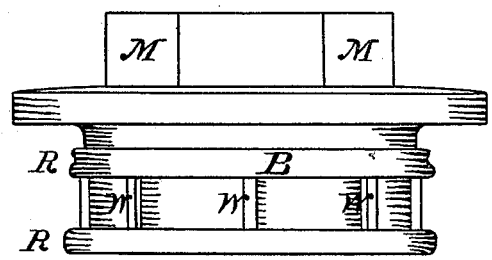

Fig. 2 illustrates the manner of forming the exterior of the plug B of Fig. 1, as well as the cap upon which it is formed, shown in perspective. Fig. 2 shows the ribs W W W and rings R R formed upon the outside of the plug B to prevent the same from turning within the Babbitt-metal jacket molded around it. A″ designates the flange formed upon the cap.

Figure 3:
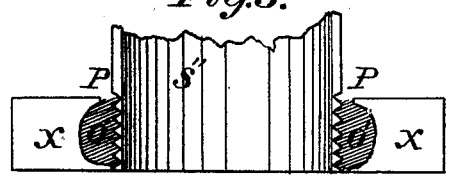

Fig. 3 illustrates the manner of forming the sprue for filling the space between the recessed wall and the introduced threaded pipe with melted Babbitt metal. This figure being a vertical section of the parts represented, and in which the recess and Babbitt metal filling it is designated at O″ O″, the threaded pipe at S″, and the sprue-openings at P P, with the vertical wall of the port-opening face at X X.

Having thus illustrated and described my invention, what I claim, and desire to secure by Letters Patent, is—

1. In combination to form the attachment of valve cap and case, an annular recess upon the entering-plug, with a threaded Babbitt metal interior filling within the recess, as and for the purposes herein shown and described.

2. In combination, the Babbitt-metal washer-surface upon the flange of the valve-cap, between the cap and case, and the Babbitt-metal jacketed plug of the cap, which forms a threaded connection between the cap and case, substantially as shown, and for the purposes described.

Signed at Troy, New York, this 31st day of July, 1876.

JOHN WARD.

Witnesses:
M. D. SCHOONMAKER,
JOHN H. HAWKINS.